Figure 1:
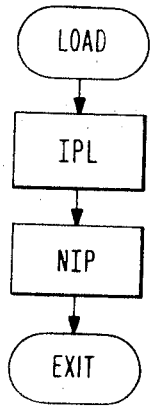
FIG. 1 PRIOR ART
Figure 2:
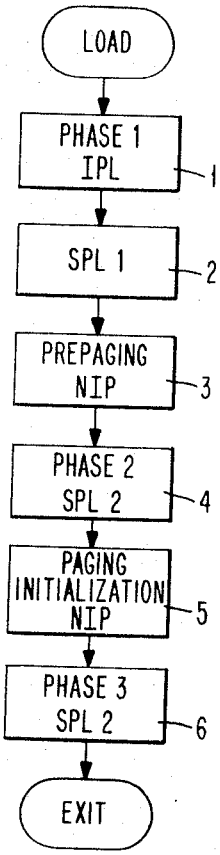
Figure 3A:
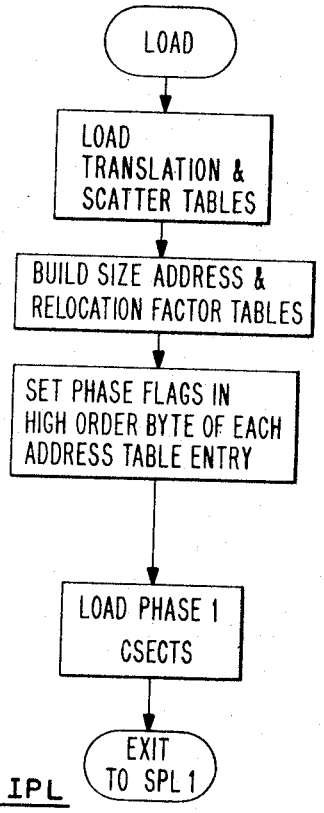
Figure 3B:
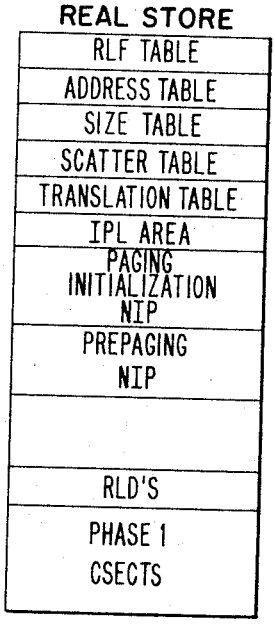
Figure 4A:
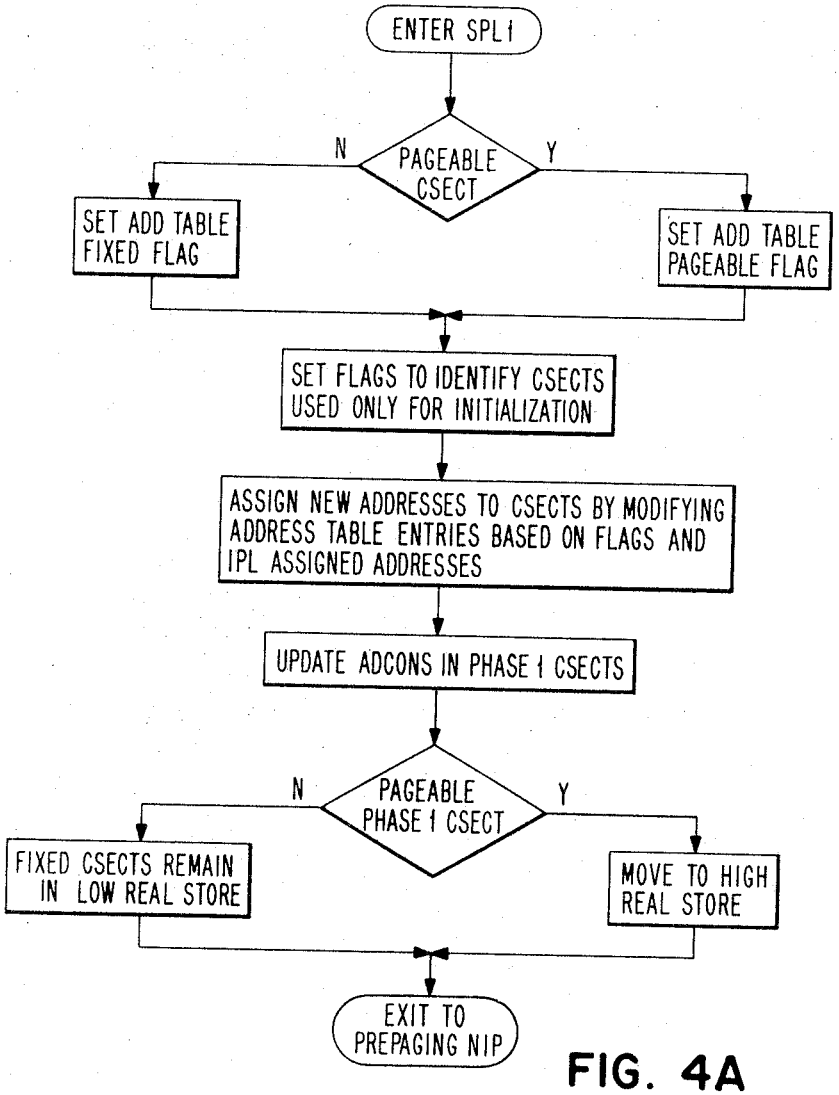
Figure 4B:
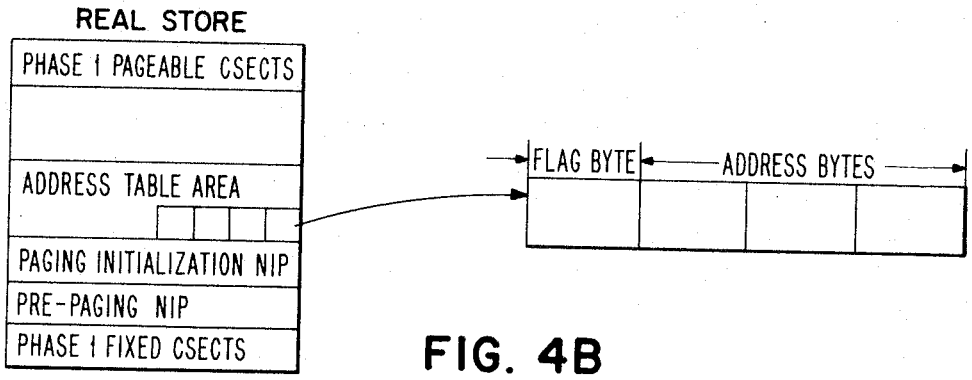
Figure 5A:
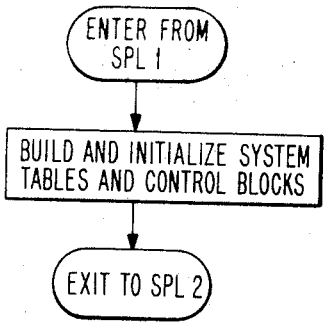
Figure 5B:
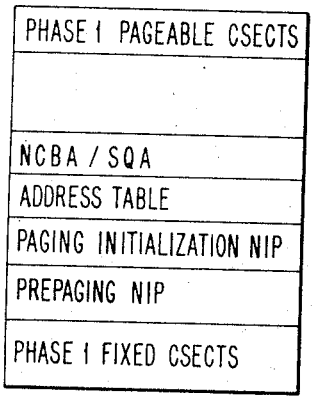
Figure 6A:
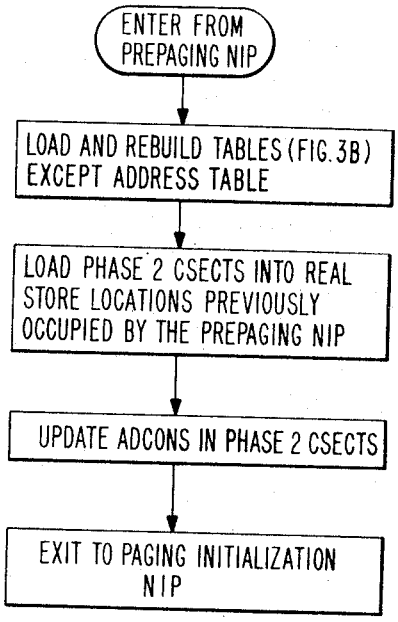
Figure 6B:
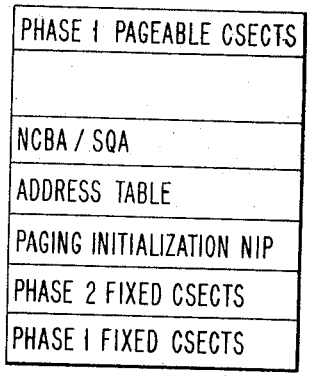
Figure 7A:
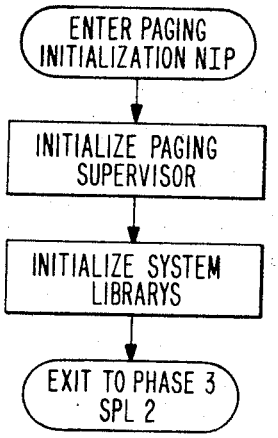
Figure 8A:
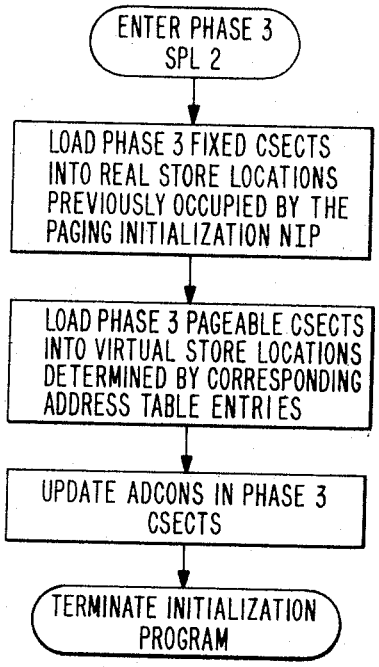
Figure 7B:
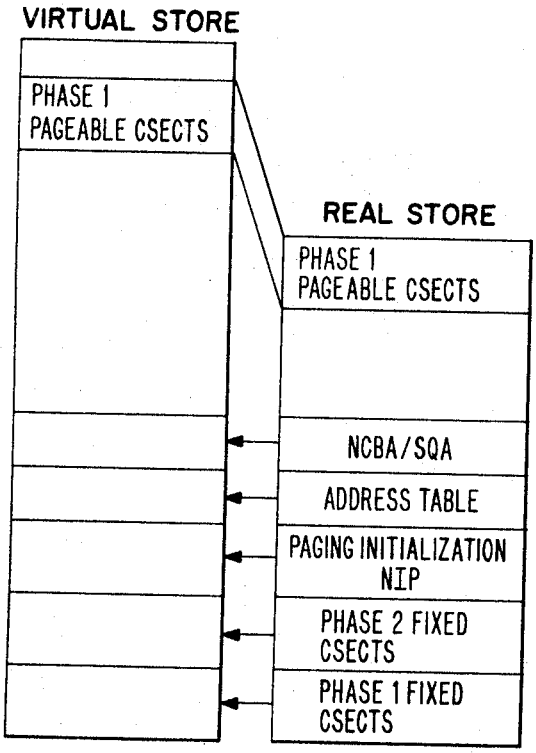
Figure 8B:
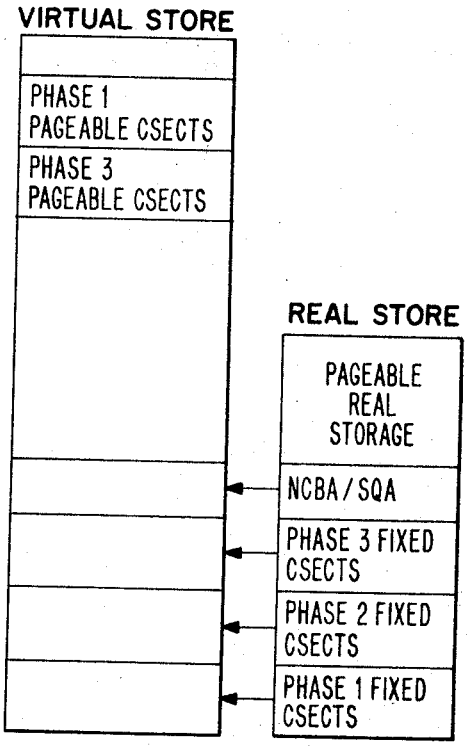
Figure 9:
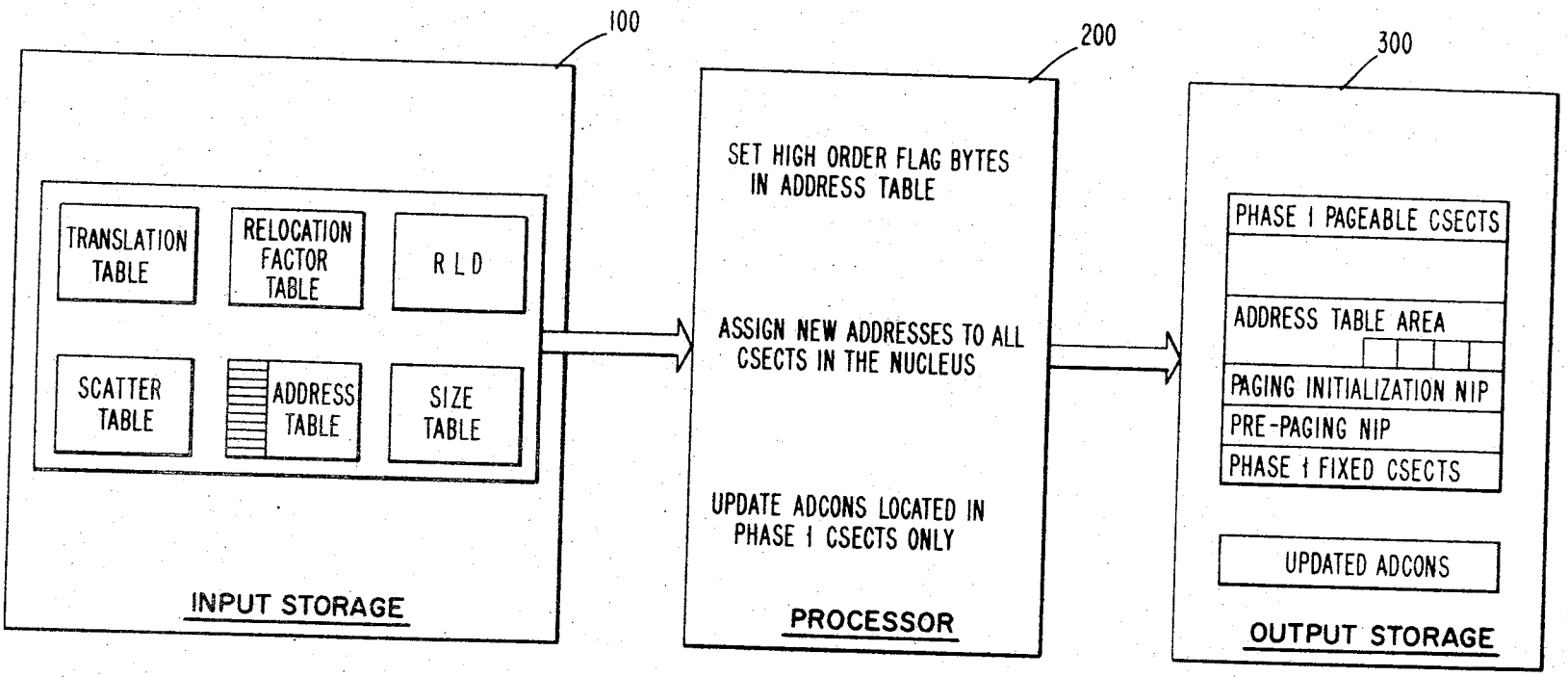
Figure 10:
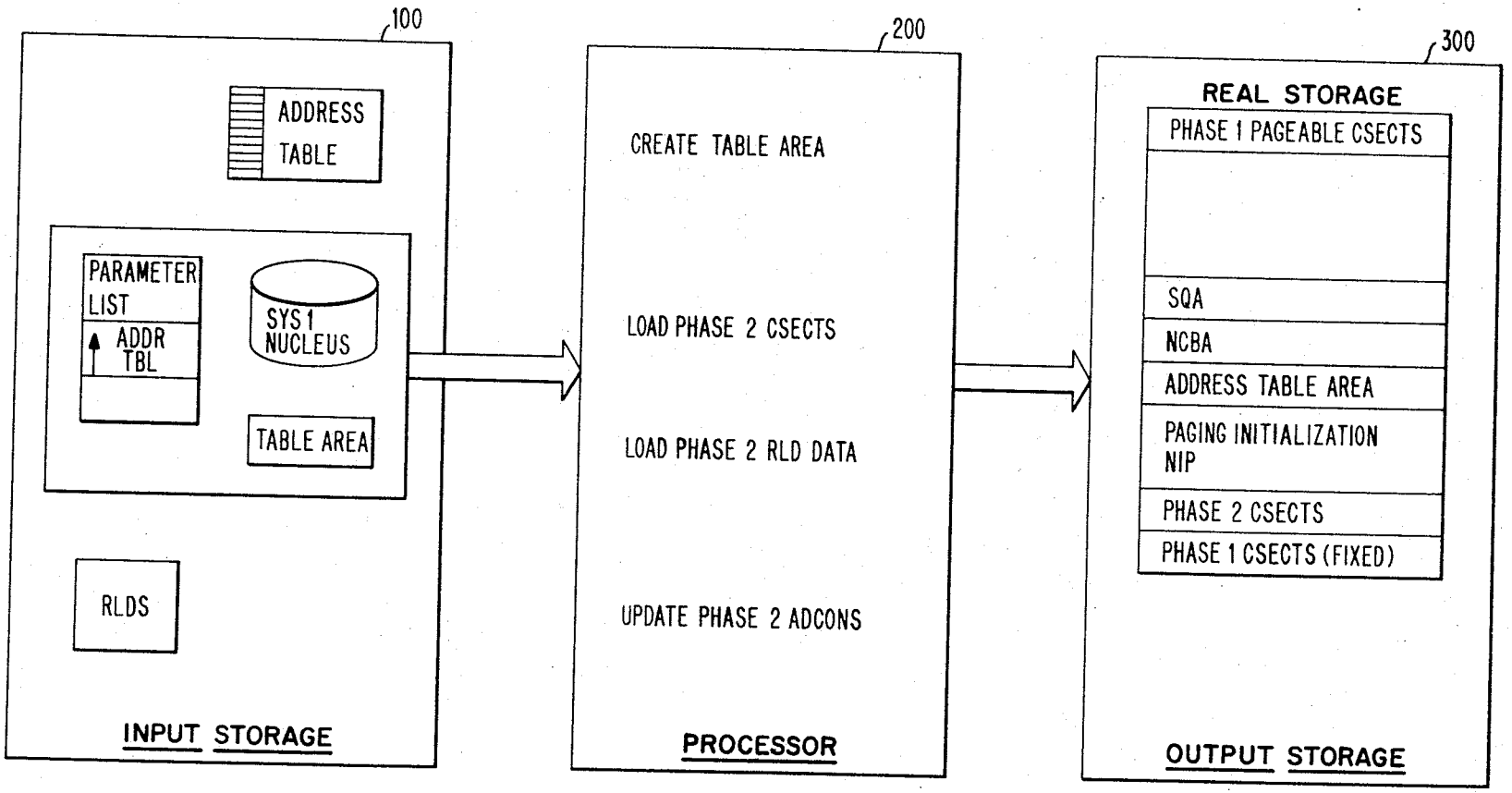
Figure 11:
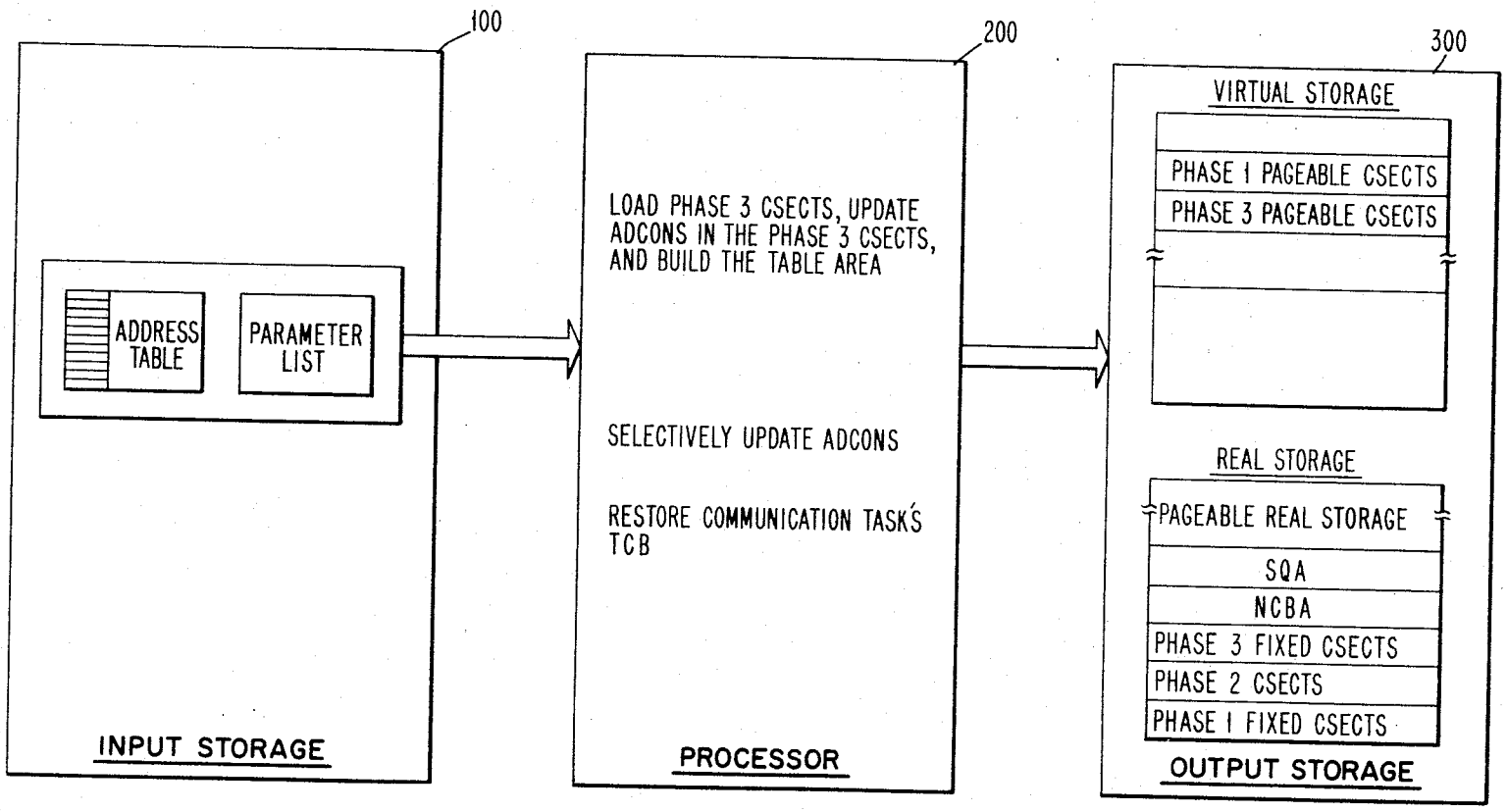

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 10, 1973

912 O.G. 402

T912,006

MULTIPHASE NUCLEUS LOADING FOR A VIRTUAL STORAGE SYSTEM

Timothy L. Brannon, Endwell, and Henry T. Mehl, and Michael R. Zick, Endicott, N.Y., assignors to International Business Machines Corporation, Armonk, N.Y.

Filed July 31, 1972, Ser. No. 276,621

Int. Cl. G06f *7/00, 9/00, 15/45*

U.S. Cl. 444—1

7 Sheets Drawing. 20 Pages Specification

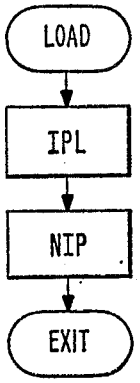

PRIOR ART

A multiphase control program nucleus loading method reduces the amount of real storage required for initialization by dividing the initialization process into phases. Each phase operatng in sequence controls the loading of a different portion of the control program nucleus into real or virtual storage. Only those portions of the control program nucleus required for performing the initialization process at a given time are loaded into real storage. After a function is completed, the obsoleted portion of the nucleus is overlaid with another portion of the nucleus which will perform a next series of functions which are required. By using a time dimensional scatter loading technique for loading portions of the control program nucleus only when they are required for their function, the amount of real storage required for nucleus initialization is significantly reduced; and pageable portions of the control program nucleus not required for initialization are loaded directly into virtual storage.

MULTIPHASE NUCLEUS LOADING FOR A VIRTUAL STORAGE SYSTEM

Filed July 31, 1972 7 Sheets-Sheet 1

PHASE 1 IPL

MULTIPHASE NUCLEUS LOADING FOR A VIRTUAL STORAGE SYSTEM

Filed July 31, 1972 7 Sheets-Sheet 3

PREPAGING NIP

PHASE 2 SPL 2

MULTIPHASE NUCLEUS LOADING FOR A VIRTUAL STORAGE SYSTEM

Filed July 31, 1972 7 Sheets-Sheet 5